United States Patent [19]

Masuyama

[11] Patent Number: 4,907,108
[45] Date of Patent: Mar. 6, 1990

[54] DELAYED-ACTION MOTOR CONTROL CIRCUIT FOR REDUCING LOAD CURRENT

[75] Inventor: Yasuhiro Masuyama, Tokyo, Japan
[73] Assignee: NEC Corporation, Tokyo, Japan
[21] Appl. No.: 247,147
[22] Filed: Sep. 21, 1988
[30] Foreign Application Priority Data Sep. 21, 1987 [JP] Japan .................. 62-237685

[51] Int. Cl.⁴ .................. G11B 5/54; G11B 21/08
[52] U.S. Cl. .................................................. 360/78.04
[58] Field of Search .............. 388/814; 360/78.04, 360/78.12

[56] References Cited

U.S. PATENT DOCUMENTS 3,860,861  1/1975  Gucker ........................... 360/78.07

*Primary Examiner*—Vincent P. Canney
*Assistant Examiner*—David L. Robertson
*Attorney, Agent, or Firm*—Sughrue, Mion, Zinn, Macpeak & Seas

[57] ABSTRACT

A head drive motor operating circuit comprises a first delay circuit for generating a first pulse of duration T1 in response to an end-of-seek pulse which is generated by a control circuit. A second delay circuit is provided for generating a second pulse of duration T2 in response to the seek command input pulse if it occurs in the presence of the first pulse and for generating a seek command output pulse for application to the motor and at the end of the second pulse or in response to the seek command input pulse if it occurs in the absence of the first pulse. A seek inhibit signal is generated during an interval between the seek command output pulse and a subsequent end-of-seek pulse and applied to the control circuit to prevent it from initiating the next seek. If a seek command input pulse is generated immediately following an end-of-seek pulse, a delay time of at least T2 is therefore introduced to the application of a seek command output pulse to the motor, reducing the amount of currents to be supplied to the motor for a given interval of time.

2 Claims, 2 Drawing Sheets

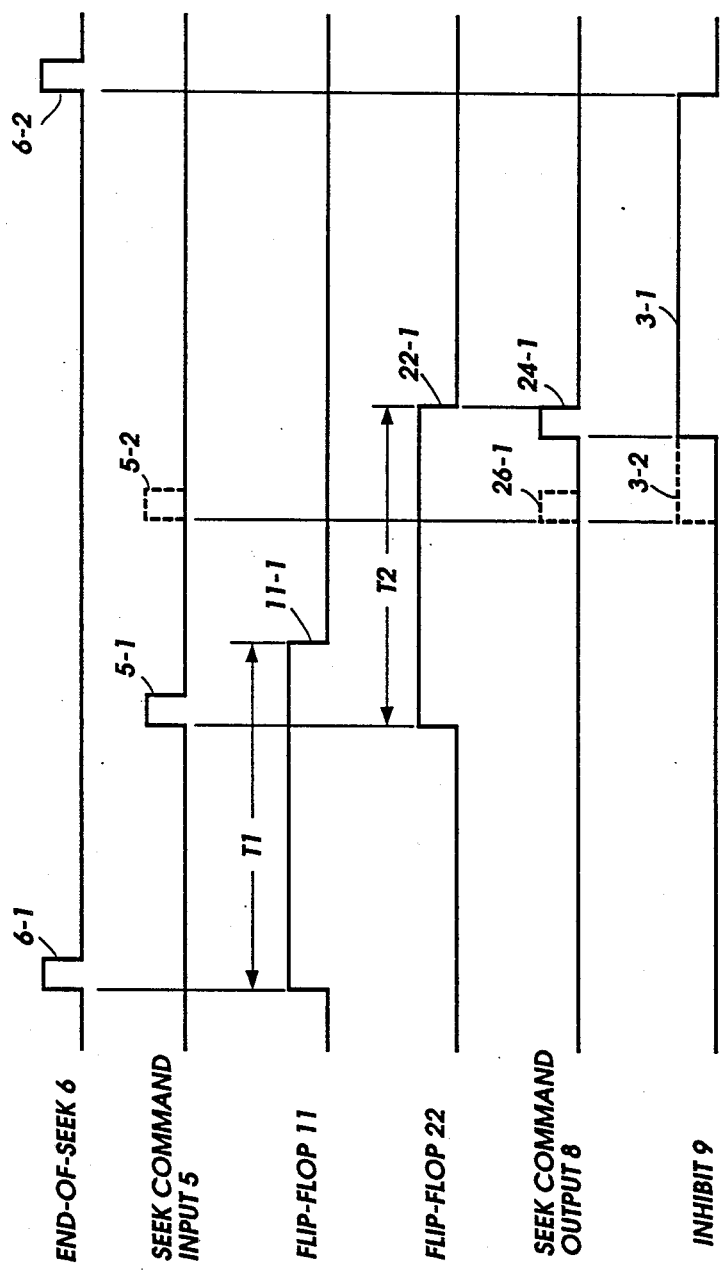

DELAYED-ACTION MOTOR CONTROL CIRCUIT FOR REDUCING LOAD CURRENT

BACKGROUND OF THE INVENTION

The present invention relates generally to magnetic disk drives for use in computers, and more specifically to a circuit for operating a head drive motor.

Magnetic disks have been extensively used in computer systems as high-speed random access files. Due to their high speed, mass storage capabilities, magnetic disks play an increasingly important role as database for on-line data acquisition from remote users. With the increasing operating speed of the computer, demands have arisen to speed the read/write operation of the disk by reducing the seek time. Although frequent accesses to the disk with reduced seek time have been realized with a high-speed carriage mechanism with a voice coil motor operating with large current, sufficient heat insulation must be provided to protect the motor under peak loads. Due to the high peak load requirements, the prior art carriage is not only costly but inefficient for operation during off-peak loads.

SUMMARY OF THE INVENTION

It is therefore an object of the present invention to provide a circuit for operating a head drive motor which relaxes heat insulation requirements of the motor to reduce cost and realize an efficient head drive motor.

This object is obtained by introducing a delay to a seek command input from the computer system if it occurs during a specified period of time following the generation of an end-of-seek signal.

Specifically, the head drive motor operating circuit of the present invention comprises a first delay circuit for generating a first pulse of duration T1 in response to an end-of-seek pulse which is generated by a control circuit. A second delay circuit is provided for generating a second pulse of duration T2 in response to the seek command input pulse if it occurs in the presence of the first pulse and for generating a seek command output pulse at the end of the second pulse or in response to the seek command input pulse if it occurs in the absence of the first pulse. The seek command output pulse is applied to the head drive motor. A seek inhibit signal is generated during an interval between the time of occurrence of the seek command output pulse and the time of occurrence of a subsequent end-of-seek pulse and applied to the control circuit to prevent it from initiating the next seek operation.

If a seek command input pulse is generated immediately following an end-of-seek pulse, a delay time in the range between T2 and T1 + T2 is introduced to the seek command output pulse depending on the time of occurrence of the seek command input pulse, and a seek inhibit pulse is supplied to the control circuit until the next end-of-seek pulse is generated. If a seek command input pulse is generated following an interval greater than T1 after an end-of-seek pulse, a seek command output pulse is immediately supplied to the motor. Thus, currents supplied to the motor during peak loads can be averaged out over time and the amount of heat insulation required can be reduced.

BRIEF DESCRIPTION OF THE DRAWINGS

The present invention will be described in further detail with reference to the accompanying drawings, in which:

FIG. 2 is a timing diagram associated with the motor operating circuit of the invention.

DETAILED DESCRIPTION

Figure 1:
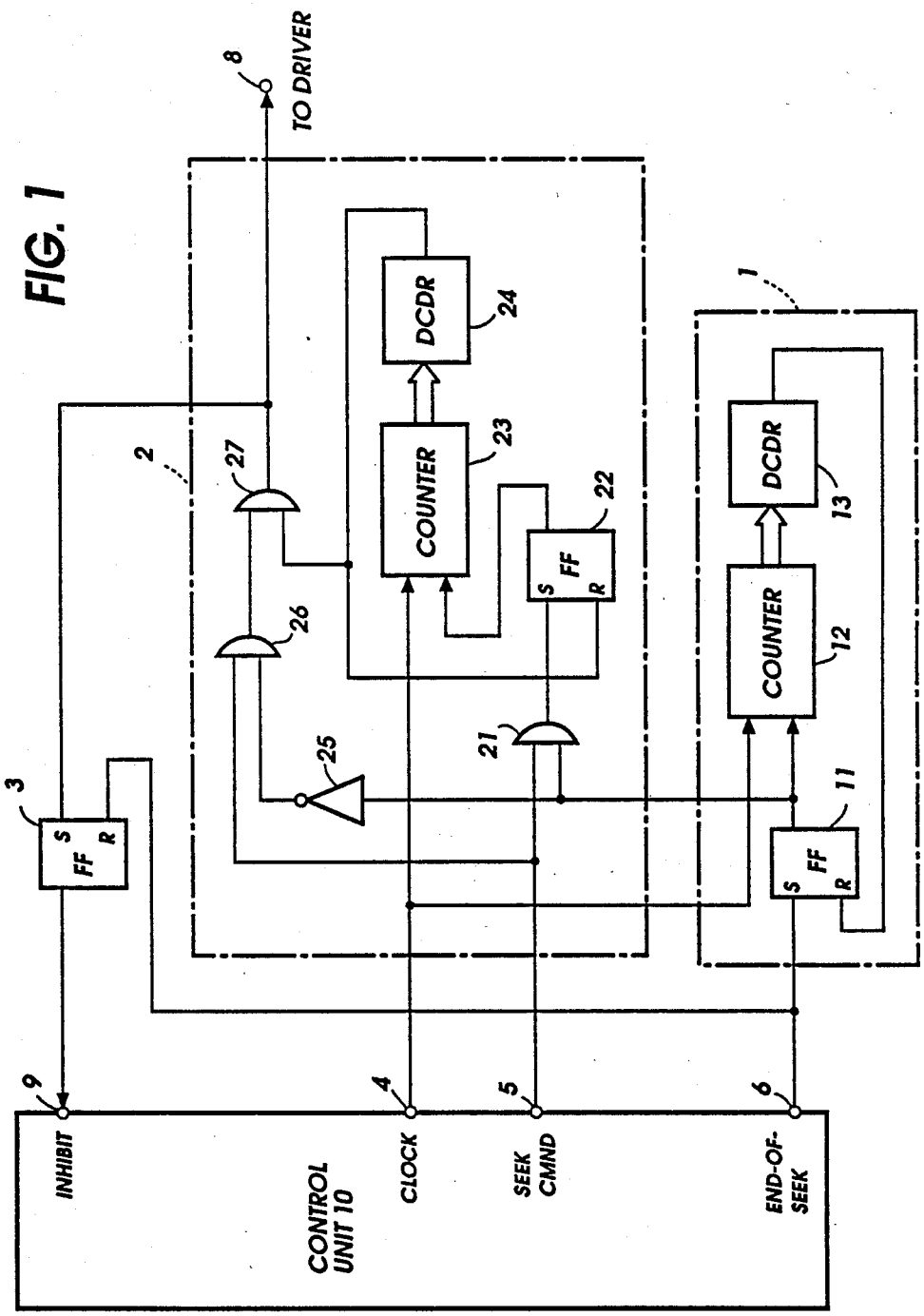
FIG. 1 is a block diagram of a motor operating circuit for a magnetic disk drive according to the present invention.

In FIG. 1, the motor operating circuit of the present invention generally comprises a first delay circuit 1, a second delay circuit 2 and a seek inhibit circuit, or flip-flop 3.

The first delay circuit 1 comprises a flip-flop 11, a counter 12 and a decoder 13. Flip-flop 11 has a set input connected to an end-of-seek output port 6 of a control unit 10 to respond to an end-of-seek pulse for enabling the counter 12 to initiate a count operation. Counter 12, when enabled, starts counting a clock pulse supplied from a clock terminal 4 of the control unit 10 and generates a binary count value which is decoded by the decoder 13. A reset pulse is supplied from decoder 13 to the reset input of flip-flop 11 when the count reaches a predetermined value. In this way, a pulse for a duration T1 is generated as the output of flip-flop 11 immediately following an end-of-seek pulse from the output terminal 6.

The second delay circuit 2 includes an AND gate 21 which is coupled to the output of flip-flop 11 and a seek-command output terminal 5 of the control unit 10 to supply a logic-1 output to the set input of a flip-flop 22 in response a seek command pulse from terminal 5 if it occurs in the presence of a pulse from the output of flip-flop 11 of delay pulse generator 1. A counter 23 is enabled in response to the output of flip-flop 22 to start counting the clock pulse from the output terminal 4 to supply a binary count value to a decoder 24. When the count reaches a predetermined value, decoder 24 generates a reset pulse, which is supplied to the reset input of flip-flop 22 on the one hand and to an output terminal 8 through an OR gate 27 on the other as a seek command output pulse. Thus, flip-flop 22 generates a pulse of duration T2 in response to the seek command input pulse from terminal 5 if it occurs in the presence of the pulse of duration T1 generated by the first delay circuit 1. A motor driver, not shown, is connected to the output terminal 8 to energize the voice coil of the head drive motor in response to the seek command output pulse. The output of flip-flop 11 of the first delay circuit 1 is further connected through an inverter 25 to an input of an AND gate 26 to which the seek command input pulse from terminal 5 is also applied. The output of AND gate 26 is connected through OR gate 27 to output terminal 8 to supply a seek command output pulse if the seek command input pulse from terminal 5 occurs in the absence of the pulse of duration T1 from the first delay circuit 1.

Flip-flop 3 is connected so that it switches to a set condition in response to the output of OR gate 27 and supplies a seek inhibit pulse to an inhibit terminal 9 of the control unit 9. Flip-flop 3 is reset by the endof-seek pulse from terminal 6.

The operation of the motor control circuit will be described below with reference to FIG. 2.

In response to an end-of-seek pulse 6-1 from terminal 6, flip-flop 11 generates a pulse 11-1 of duration T. If a seek command input pulse 5-1 is supplied to the seek command circuit 3 in the presence of the pulse 11-1, the flip-flop 22 of command circuit 3 generates a pulse 22-1 and hence a seek command output pulse 24-1 is supplied from decoder 24 to the head drive motor, not shown, through the output terminal 8. The output of flip-flop 3 is switched to a logic-1 level in response to the seek command output pulse 24-1 until it is switched back to logic-0 in response to the next end-of-seek pulse 6-2, generating a seek inhibit pulse 3-1 to indicate that a seek operation is being performed. Therefore, if the seek command input pulse is generated immediately following the leading edge of the pulse 11-1, a seek command output pulse is generated following a delay interval approximately equal to T2 and if it is generated immediately preceding the trailing edge of the pulse 11-1 the seek command output pulse is generated following a delay interval approximately equal to T1+T2. Thus, the occurrence of a seek command input pulse during the presence of the pulse 11-1 causes the seek command output pulse to be delayed for an interval ranging from T2 to T1+T2 with respect to the end-of-seek pulse G-1.

On the other hand, if the seek command input pulse is generated in the absence of the pulse 11-1 as indicated by numeral 5-2, AND gate 26 is activated and supplies a seek command output pulse 26-1 to output terminal 8, causing a seek inhibit pulse 3-2 to be applied to the control circuit 10. Thus, the occurrence of a seek command input pulse immediately following the pulse 11-1 instantly produces a seek command output pulse which corresponds to one which is delayed by the first delay circuit by at least T1 in the presence of the pulse 11-1. Therefore, under any circumstances, the seek command output pulse is generated following a minimum delay time T1 after the occurrence of an end-of-seek pulse, and hence the current supplied to the voice coil of the head drive motor can be averaged out over time, reducing the peak current value.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A circuit for operating a head drive motor to obtain information from a disk in response to a seek command input pulse which is generated by a control circuit subsequent to an end-of-seek pulse, comprising:
    a first delay circuit for generating a first pulse of a fixed duration in response to said end-of-seek pulse;
    a second delay circuit for generating a second pulse of a fixed duration in response to said seek command input pulse if same occurs in the presence of said first pulse and for generating a seek command output pulse at the end of said second pulse or in response to said seek command input pulse if same occurs in the absence of said first pulse and applying said seek command output pulse to said head drive motor; and
    means for generating a seek inhibit signal during an interval between the time of occurrence of said seek command output pulse and the time of occurrence of a subsequent end-of-seek pulse and for applying the seek inhibit signal to said control circuit.

2. A circuit as claimed in claim 1, wherein said first delay circuit comprises:
    a first flip-flop having a first input terminal responsive to said endof-seek pulse for generating an output pulse as said first pulse of fixed duration and a second input terminal responsive to a reset pulse applied thereto for terminating said output pulse; and
    a first counter means enabled in response to said output pulse from said first flip-flop for counting a clock pulse and generating said reset pulse when the count reaches a predetermined value,
    wherein said second delay circuit comprises:
    a first AND gate having a first input terminal responsive to said seek command input pulse and a second input terminal responsive to said output pulse of said first flip-flop;
    a second flip-flop having a first input terminal responsive to an output signal from said first AND gate for generating an output pulse as said second pulse of fixed duration and a second input terminal responsive to a reset pulse applied thereto for terminating said output pulse of the second flip-flop;
    a second counter means enabled in response to said output pulse from said second flip-flop for counting said clock pulse and generating said reset pulse of said second flip-flop when the count reaches a predetermined value;
    an inverter for inverting the output signal of said first flip-flop;
    a second AND gate having a first input terminal connected to the output of said inverter and a second input terminal responsive to said seek command input pulse; and
    an OR gate for coupling the outputs of said second counter means and said second AND gate to said head drive motor,
    and wherein said seek inhibit signal generating means comprises a third flip-flop having a first input terminal connected to the output of said OR gate and a second input terminal responsive to said end-of seek pulse, the output of said third flip-flop being connected to said control circuit for applying said seek inhibit signal.

* * * * *